United States Patent
Seifert et al.

(10) Patent No.: US 7,248,700 B2
(45) Date of Patent: Jul. 24, 2007

(54) DEVICE AND METHOD FOR CALCULATING A RESULT OF A MODULAR EXPONENTIATION

(75) Inventors: Jean-Pierre Seifert, Munich (DE); Joachim Velten, Biedenkopf (DE)

(73) Assignee: Infineon Technologies AG (DE)

( * ) Notice: Subject to any disclaimer, the term of this patent is extended or adjusted under 35 U.S.C. 154(b) by 700 days.

(21) Appl. No.: 10/789,373

(22) Filed: Feb. 27, 2004

(65) Prior Publication Data

US 2004/0215685 A1 Oct. 28, 2004

Related U.S. Application Data

(63) Continuation of application No. PCT/EP02/09405, filed on Aug. 22, 2002.

(30) Foreign Application Priority Data

Sep. 6, 2001 (DE) ................. 101 43 728

(51) Int. Cl.
*G06F 7/00* (2006.01)
(52) U.S. Cl. .............. 380/282; 708/491; 708/205; 708/492; 380/30
(58) Field of Classification Search ......... 708/492, 708/491, 205; 380/282, 30
See application file for complete search history.

(56) References Cited

U.S. PATENT DOCUMENTS 5,008,668 A * 4/1991 Takayama et al. ......... 341/83
5,991,415 A 11/1999 Shamir
7,016,500 B1 * 3/2006 Von Der Heidt et al. ... 380/282
7,023,990 B1 * 4/2006 Arita .......................... 380/28

FOREIGN PATENT DOCUMENTS

| EP | 0 872 795 A1 | 10/1998 |
|---|---|---|
| GB | 2 318 892 A1 | 5/1998 |
| WO | WO-98/52319 A1 | 11/1998 |
| WO | WO-99/35782 A1 | 7/1999 |

OTHER PUBLICATIONS

Claus P. Schnorr; "Efficient Identification and Signatures for Smart Cards"; Lecture Notes in Computer Science Bd. 434, Berlin, Springer, 1998, pp. 239-252.

* cited by examiner

*Primary Examiner*—Kim Vu
*Assistant Examiner*—April Y. Shan
(74) *Attorney, Agent, or Firm*—Dickstein, Shapiro, LLP.

(57) ABSTRACT

In a device for calculating a result of a modular exponentiation, the Chinese Residue Theorem (CRT) is used, wherein two auxiliary exponentiations are calculated using two auxiliary exponents and two sub-moduli. In order to improve the safety of the RSA CRT calculations against cryptographic attacks, a randomization of the auxiliary exponents and/or a change of the sub-moduli are performed. Thus, there is a safe RSA decryption and RSA encryption, respectively, by means of the calculating time efficient Chinese Residue Theorem.

5 Claims, 3 Drawing Sheets

DEVICE AND METHOD FOR CALCULATING A RESULT OF A MODULAR EXPONENTIATION

This application is a Continuation of International Patent Application No. PCT/EP02/09405, filed Aug. 22, 2002, which published in German on Mar. 20, 2003 as WO03/023605 A2.

BACKGROUND OF THE INVENTION

1. Field of the Invention

The present invention relates to modular exponentiation and, in particular, to modular exponentiation using the Chinese Residue Theorem (CRT).

2. Description of the Related Art

Before the RSA crypto-system will be explained in greater detail, some basic concepts of cryptography will be summarized. In general, we distinguish between symmetrical encrypting methods, which are also referred to as secret key encrypting methods, and public key encrypting methods, which are also referred to as encrypting methods having a public key.

A communication system having two parties which use an encryption with a symmetrical key can be described as follows. The first party communicates its encryption key via a safe channel to the second party. Subsequently, the first party encrypts the secret message by means of the key and transfers the encrypted message via a public or non-safe channel to the second party. The second party then decrypts the encrypted message using the symmetrical key having been communicated to the second party via the safe channel. A considerable problem in such encrypting systems is to provide an efficient method for exchanging the secret keys, i.e. for finding a safe channel.

An asymmetrical encryption in contrast takes place as follows. One party who wants to obtain a secret message communicates its public key to the other party, i.e. the party from which it wants to obtain a secret message. The public key is communicated via a non-safe channel, i.e. via a "public" channel.

The party who wants to send a secret message receives the public key of the other party, encrypts the message using the public key and sends the encrypted message again via a non-safe channel, i.e. via a public channel, to the party from which the public key comes. Only that party having produced the public key is able to provide a private key to decrypt the encrypted message. Not even the party having encrypted its message using the public key is able to decrypt the message. An advantage of this concept is that no safe channel between the two parties, i.e. no secret key exchange, is required. The party having encrypted the message must not know the private key of the message recipient.

A physical analogy to the asymmetrical encryption concept or public key encryption concept is as follows. A metal box is considered, the lid of which is locked by a combination lock. Only that party who wants to obtain an encrypted message knows the combination. If the lock is left open and made available in public, every party who wants to transmit a secret message can put this message into the metal box and close the lid. Only that party from which the box originates, however, knows the combination of the combination lock. It is only this party who is able to decrypt the message, i.e. to open the metal box again. Even that party who put the message into the box is no longer able to take the message out of it again.

Of importance for asymmetrical or public key encryption concepts is the basic mathematical problem, the solution of which for decrypting is nearly impossible using the public key, the solution of which is, however, easily possible knowing the private key. One of the best-known public key crypto-systems is the RSA crypto-system. The RSA crypto-system is described in "Handbook of Applied Cryptography", Menezes, van Oorschot, Vanstone, CRC Press 1997, pages 285-291.

Subsequently, reference will be made to FIG. 3 to illustrate the RSA algorithm. The initial situation is that one communication partner encrypts a message m which the other communication partner has to decrypt again. The encrypting entity must at first, in step 200, obtain the public key (n, e) in order to be able to send the other party an encrypted message. Subsequently, the encrypting entity, in step 210, must present the message to be encrypted as an integer m, wherein m has to be within the interval from 0 to n−1. In step 220, which is the actual encrypting step, the encrypting entity must calculate the following equation:

$$c = m^e \bmod n.$$

c is the encrypted message. It is then output in step 230 and transferred to the recipient of the encrypted message via a public channel which, in FIG. 2, is referred to by 240. The recipient, in step 250, receives the encrypted message c and, in step 260, which is the actual decrypting step, performs the following calculation:

$$m = c^d \bmod n.$$

It can be seen from FIG. 3 that only the public key (n, e) is required for encrypting but not the private key d, while when decrypting the private key d is required.

The question is how an attacker can violate an RSA crypto-system. He knows the public key, that is n and e. He could factorize the modulus n into a product of two prime numbers and then precisely calculate the secret key d like the key-generating authentic party has done. For this, the attacker would have to test all the possible prime number pairs p', q' to find the private key d sometime taking e into consideration as well. With small prime numbers p and q, this problem can be solved relatively easily by testing. If p and q, i.e. the modulus n equaling the product of p and q, become larger, the different possibilities for factorizing the modulus n will also increase extremely. This is the basis for the safety of the RSA system. Thus, it is obvious that a safe RSA crypto-system must use very long numbers which could, for example, have a length of 512, 1024 or even 2048 bits.

It can be seen from FIG. 3 that a modular exponentiation must be calculated for both an RSA encryption to produce an encrypted message c from a non-encrypted message m and for decrypting to generate a decrypted message m from an encrypted message c. This is made clear in FIG. 3 by steps 220 and 260. When calculating the modular exponentiation, the Chinese Residue or Remainder Theorem (CRT) is of special advantage when the integers used and, in particular, the modulus n, are long numbers. As has been explained, the safety of the RSA algorithm, however, is based on the fact that the integers are long.

The Chinese Residue Theorem is described in "Handbook of Applied Cryptography" mentioned above on page 610 and the following pages. The Chinese Residue Theorem, in particular in its form known as the Garner's algorithm, is based on the idea of splitting the modular exponentiation with the modulus n into two modular exponentiations of second sub-moduli p, q, wherein the sub-moduli p, q are prime numbers, and wherein the product of them results in modulus n. A modular exponentiation with a long modulus is thus split into two modular exponentiations having shorter sub-moduli (typically having half the length). This method is of advantage in that calculating units having only half the length are required or that, when the length of the calculating unit remains the same, numbers which have double the length can be used, which results in a more favorable relation of safety and chip area, i.e., in general in an improved relation of performance and price.

The Chinese Residue Theorem, applied to the modular exponentiation described, is as follows. At first, two prime numbers pq which should, if possible, have an equal length and the product p×q of which results in the modulus n, are calculated. Subsequently, a first auxiliary quantity dp is calculated as follows:

$$dp = d \bmod (p-1)$$

Then, a second auxiliary quantity dq is calculated:

$$dq = d \bmod (q-1)$$

Subsequently, a third auxiliary quantity Mp is calculated:

$$Mp = c^{dp} \bmod p$$

Another auxiliary quantity Mq is calculated as follows:

$$Mq = c^{dq} \bmod q$$

In a final summarizing step, the result of the modular exponentiation, i.e. in the present example, the plain text message m, is calculated as follows, assuming c to be the encrypted message:

$$m = Mq + [(Mp - Mq) \times q^{-1} \bmod p] \times q$$

It can be seen from the above illustration of the Chinese Residue Theorem that a modular exponentiation with a long modulus n has been split into two modular exponentiations with sub-moduli p, q having half the length and that, in a last step for calculating the plain text message m, a summarizing operation is performed, in which the multiplicative inverse $q^{-1}$ in relation to a sub-modulus p is required. Since the sub-modulus p is shorter than the original modulus n, the calculation of the multiplicative inverse $q^{-1}$, such as, for example, using the extended Euclidian algorithm, is possible with a justifiable calculating complexity.

Although the usage of the Chinese Residue Theorem reduces the calculating time efficiency and the chip area consumption of a safety IC, respectively, the Chinese Residue Theorem has problems concerning attacks on the cryptography system, such as, for example, so-called side channel attacks, power analyses or fault attacks. An attacker could perform such attacks on the algorithm to "crack" the private key d.

In the case of an RSA encryption, i.e. when an encrypted message c is to be calculated from the plain text message, the safety problem is not that evident since, for encrypting a message, only the public key e is used anyway. The problem, however, occurs when using RSA as a signature algorithm.

SUMMARY OF THE INVENTION

It is the object of the present invention to provide a safe and efficient concept for calculating the modular exponentiation protecting the RSA signature from fault attacks by means of CRT.

In accordance with a first aspect, the present invention provides a device for calculating a result of a modular exponentiation, n being a modulus, d being an exponent and c being a quantity to be subjected to the modular exponentiation, having: means for calculating a first auxiliary quantity dp, wherein dp is defined as follows: dp=d mod(p−1), wherein p is a first prime number; means for calculating a second auxiliary quantity dq, wherein dq is defined as follows: dq=d mod(q−1), wherein q is a second prime number, wherein a product of p and q equals the modulus n; means for generating a random number (IRND); means for generating a third auxiliary quantity dp', wherein dp' is defined as follows: dp'=IRND×(p−1)+dp; means for generating a fourth auxiliary quantity dq', wherein dq' is defined as follows: dq'=IRND×(q−1)+dq; means for generating a fifth auxiliary quantity Mp, wherein the fifth auxiliary quantity Mp is defined as follows: Mp=$c^{dp'}$ mod p; means for generating a sixth auxiliary quantity Mq, wherein the sixth auxiliary quantity Mq is defined as follows: Mq=$c^{dq'}$ mod q; and means for calculating the result of the modular exponentiation m, wherein m is defined as follows: m=Mq+[(Mp−Mq)×$q^{-1}$ mod p]×q.

In accordance with a second aspect, the present invention provides a device for calculating a result of a modular exponentiation, n being a modulus, d being an exponent and c being a quantity to be subjected to the modular exponentiation, having: means for calculating a first auxiliary quantity dp, wherein dp is defined as follows: dp=d mod(p−1), wherein p is a first prime number; means for calculating a second auxiliary quantity dq, wherein dq is defined as follows: dq=d mod(q−1), wherein q is a second prime number, wherein a product of p and q equals the modulus n; means for providing a safety parameter T; means for generating a third auxiliary quantity p×T and a fourth auxiliary quantity q×T; means for generating a fifth auxiliary quantity Mp, wherein the fifth auxiliary quantity Mp is defined as follows: Mp=$c^{dq}$ mod(p×T); means for generating a sixth auxiliary quantity Mq, wherein the sixth auxiliary quantity Mq is defined as follows: Mq=$c^{dq}$ mod(q×T); and means for calculating the result of the modular exponentiation m, wherein m is defined as follows: m=Mq+[(Mp−Mq)×$q^{-1}$ mod p]×q.

In accordance with a third aspect, the present invention provides a method for calculating a result of a modular exponentiation, n being a modulus, d being an exponent and c being a quantity to be subjected to the modular exponentiation, having the following steps: calculating a first auxiliary quantity dp, wherein dp is defined as follows: dp=d mod(p−1), wherein p is a first prime number; calculating a second auxiliary quantity dq, wherein dq is defined as follows: dq=d mod(q−1), wherein q is a second prime number, wherein a product of p and q equals the modulus n; providing a random number (IRND); generating a third auxiliary quantity dp', wherein dp' is defined as follows: dp'=IRND×(p−1)+dp; generating a fourth auxiliary quantity dq', wherein dq' is defined as follows: dq'=IRND×(q−1)+dq; generating a fifth auxiliary quantity Mp, wherein the fifth auxiliary quantity Mp is defined as follows: Mp=$c^{dp'}$ mod p; generating a sixth auxiliary quantity Mq, wherein the sixth auxiliary quantity Mq is defined as follows: Mq=$c^{dq'}$ mod q; and calculating the result of the modular exponentiation m, wherein m is defined as follows: m=Mq+[(Mp−Mq)×$q^{-1}$ mod p]×q.

In accordance with a fourth aspect, the present invention provides a method for calculating a result of a modular exponentiation, n being a modulus, d being an exponent and c being a quantity to be subjected to the modular exponentiation, having the following steps: calculating a first auxiliary quantity dp, wherein dp is defined as follows: dp=d mod(p−1), wherein p is a prime number; calculating a second auxiliary quantity dq, wherein dq is defined as follows: dq=d mod(q−1), wherein q is a second prime number, wherein a product of p and q equals the modulus n; generating a safety parameter T; generating a third auxiliary quantity p×T and a fourth auxiliary quantity q×T; generating a fifth auxiliary quantity Mp, wherein the fifth auxiliary quantity Mp is defined as follows: Mp=$c^{dp}$ mod(p×T); generating a sixth auxiliary quantity Mq, wherein the sixth auxiliary quantity Mq is defined as follows: Mq=$c^{dq}$ mod (q×T); and calculating the result of the modular exponentiation m, wherein m is defined as follows: m=Mq+[(Mp−Mq)×$q^{-1}$ mod p]×q.

The present invention is based on the finding that the safety of the modular exponentiation, which is the basic operation for RSA encryptions, can be increased even when the Chinese Residue Theorem is employed in order to be able to calculate the RSA exponentiation more efficiently. This is achieved by randomizing auxiliary quantities required for the Chinese Residue Theorem or by introducing a safety parameter in the modular exponentiations for the sub-moduli. The randomization of the exponents and/or the change, effected by the safety parameter, of the modulus of the two "auxiliary exponentiations" of the Chinese Residue Theorem provide increased safety against side channel attacks or fault attacks.

It is another advantage of the present invention that existing crypto-processes with which the RSA exponentiation can be calculated using the CRT need not be modified, but only the CRT standard parameters must be modified, but not the central calculating steps for calculating the two modular exponentiations using the sub-moduli.

This means that all the structures present for the key management of the RSA keys can still be used.

BRIEF DESCRIPTION OF THE DRAWINGS

Preferred embodiments of the present invention will be detailed subsequently referring to the appended drawings, in which.

DESCRIPTION OF THE PREFERRED EMBODIMENTS

Figure 1:
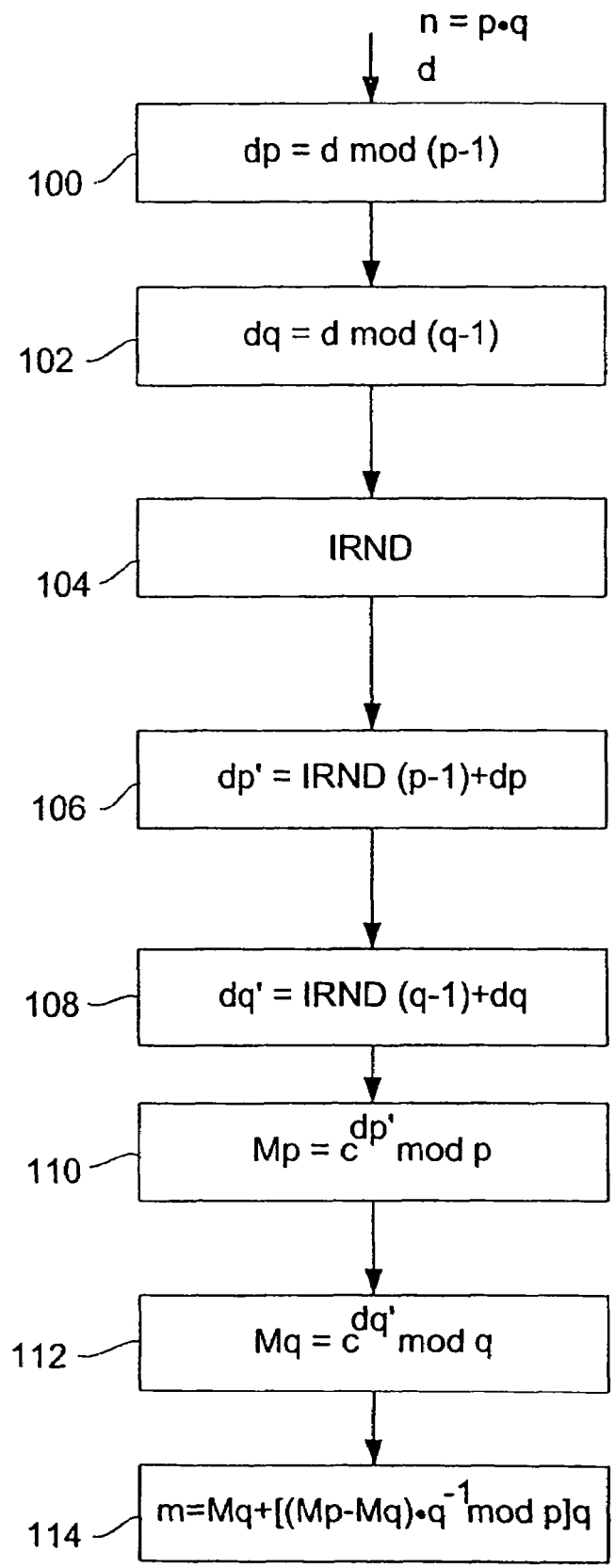
FIG. 1 shows a device for calculating the modular exponentiation according to a first embodiment of the present invention, in which the exponents of the auxiliary exponentiations are randomized.

FIG. 1 shows an inventive device for safely calculating the result of a modular exponentiation using the Chinese Residue Theorem. Input parameters are two prime numbers p, q, the product of which results in the modulus n of the modular exponentiation. The key d is another input parameter. Subsequently, the first embodiment of the present invention will be illustrated regarding the decryption in the RSA algorithm. The decrypted message m is calculated from an encrypted message c using the private key d according to the following equation:

$$m = c^d \bmod n$$

The inventive device includes means 100 for calculating the first auxiliary quantity dp according to the following equation:

$$dp = d \bmod (p-1)$$

Another means 102 for calculating a second auxiliary quantity dq executes the following equation $$dq = d \bmod (q-1)$$

The inventive device for calculating a result of a modular exponentiation further includes means 104 for generating a random number IRND 104. This means in turn is followed by means 106 to calculate a third auxiliary quantity dp' according to the following equation:

$$dp' = IRND \times (p-1) + dp$$

The third auxiliary quantity dp' is thus a randomized exponent of the first auxiliary exponentiation which is calculated by means 110 for calculating the fifth auxiliary quantity Mp formed to execute the following equation:

$$Mp = c^{dp'} \bmod p$$

In analogy, means 108 is provided to calculate a fourth auxiliary quantity dq' according to the following equation:

$$dq' = IRND(q-1) + dq$$

Means 112 for calculating the sixth auxiliary quantity Mq operates by means of the fourth auxiliary quantity representing the randomized exponent of the second auxiliary exponentiation:

$$Mq = c^{dq'} \bmod q$$

Means 114 finally calculates the result m, i.e. in the present example, the decrypted message, according to the following equation:

$$m = Mq + [(Mp - Mq) \times q^{-1} \bmod p] \times q$$

Figure 2A:
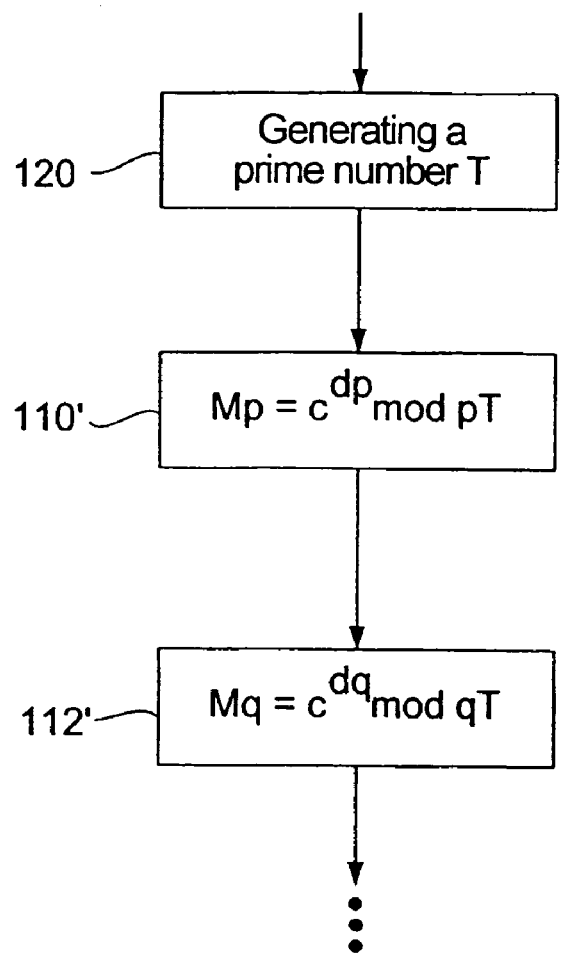
FIG. 2a shows a sector of a device for calculating the modular exponentiation according to a second embodiment of the present invention, which can be used either on its own or together with the first embodiment of the present invention, wherein the sub-moduli are randomized.

The modular exponentiation required for the RSA algorithm can additionally be formed safely when the auxiliary modulus d or the auxiliary modulus q is changed. This is illustrated in FIG. 2a. A device according to a second embodiment of the present invention includes means 120 for generating a prime number T as a safety parameter, which is preferably a relatively small prime number, in order not to "sacrifice" too much of the calculating time advantage of the Chinese Residue Theorem in favor of the safety. The result of the first auxiliary exponentiation Mp is then, as is the result of the second auxiliary exponentiation Mq, not calculated using the original auxiliary sub-modulus p, q but using the auxiliary sub-moduli p×T and q×T, respectively, provided with the safety parameter by means 110' and 112', respectively. Even the change of the sub-moduli p, q alone, i.e. without randomizing the auxiliary exponents dp' and dq', respectively, provides an increased safety against cryptographic attacks. The safest way according to the present invention is, however, to use both the randomization of the auxiliary exponents, as is illustrated in FIG. 1, and the changed auxiliary modules, as is illustrated in FIG. 2a. In this case, the device for calculating a result of a modular exponentiation would be formed as is illustrated in FIG. 1, with the difference that means 120 is provided and that means 110 and 112 of FIG. 1 use the sub-moduli pT and qT, respectively, provided with the safety parameter instead of the sub-moduli p, q.

Figure 2B:
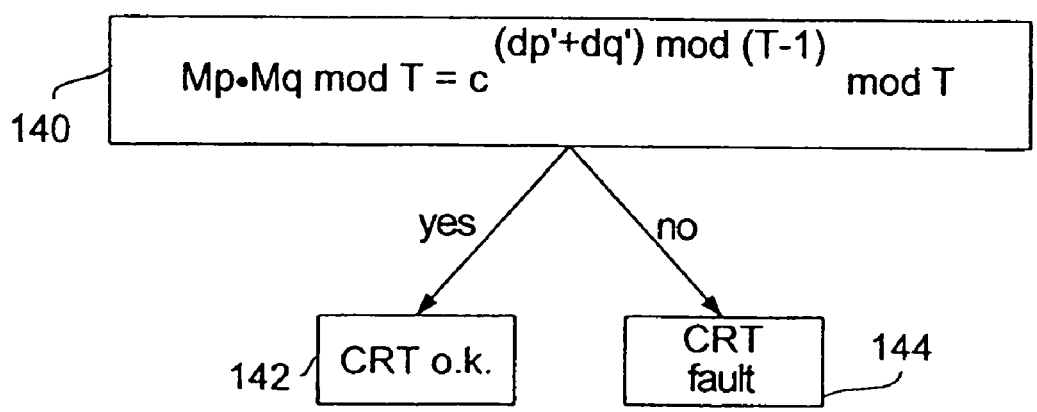
FIG. 2b shows a fault check technique for checking the results of the auxiliary exponentiations before summarizing the results.
Figure 3:
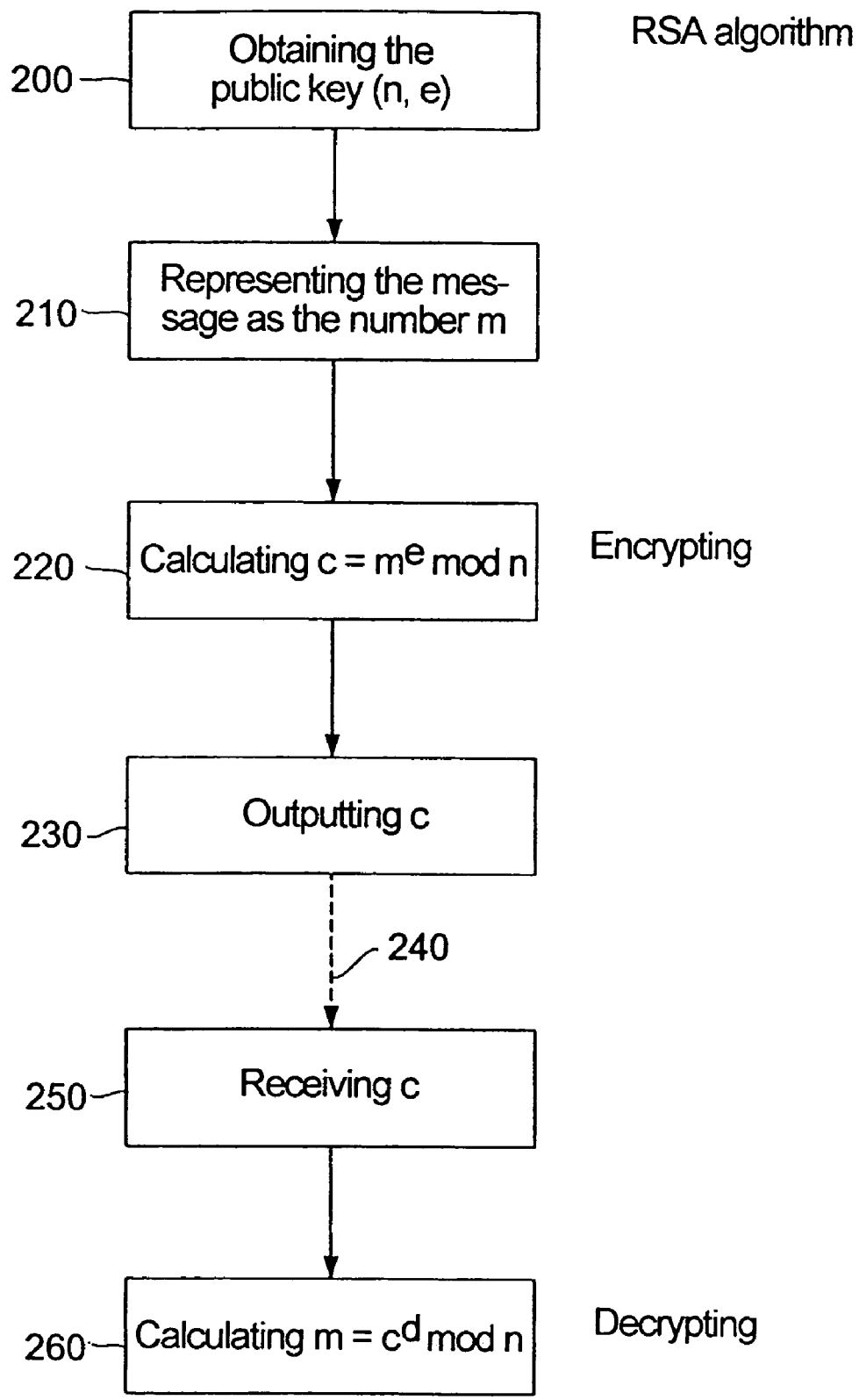
FIG. 3 is a schematic flowchart of the RSA algorithm for encrypting and decrypting.

The usage of the sub-moduli provided with the safety parameter together with the randomized exponents makes it possible, as is illustrated in FIG. 2b, to perform an auxiliary calculation before calculating the result using means 114 of FIG. 1, as is illustrated in block 140 of FIG. 2b. If this equation is satisfied, an output can be made indicating that the Chinese Residue Theorem (CRT) has been executed correctly (block 142).

If the equality condition illustrated by means 140 is not satisfied, no output 144 can take place. If a CRT fault occurs, the calculation can be interrupted here before the "summary" by means 114. Furthermore, it is ensured that the randomized auxiliary exponents dp' and dq' are tuned to the sub-moduli pT and qT, respectively, changed by the safety parameter, if, as it is preferred, the auxiliary exponents are randomized and the sub-moduli are changed. Due to the extended sub-moduli, the relatively small prime number 32771 is preferred as the safety parameter T for the purpose of a compromise between CRT calculation savings and safety.

The intermediate result check by means 140 ensures that an interruption takes place even before outputting a result of the algorithm when, for example, during the calculation of $M_p$ and/or $M_q$, a fault attack on the safety IC has been performed. This attack will fail since in the case of such an attack "CRT faults" are generated by means 140 so that there will be no output and the fault attack will thus not be successful. In addition, it is to be pointed out that this protection by the intermediate result check is not very complicated since the parameter T is preferably a small prime number so that the exponentiation in block 140 of FIG. 2b has a small exponent compared to the modulus.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for calculating a result of a modular exponentiation within an asymmetrical cryptosystem, n being a modulus, d being an exponent and a private key of the asymmetrical cryptosystem, c being a quantity to be subjected to the modular exponentiation, and, as a result, a quantity m is obtained which equals the modular exponentiation of c with the private key d as an exponent, comprising:

means for calculating a first auxiliary quantity dp, wherein the means for calculating a first auxiliary quantity is formed to calculate the first auxiliary quantity dp as follows:

$$dp = d \bmod(p-1),$$

wherein p is a first prime number, and wherein mod represents a modulo operation;

means for calculating a second auxiliary quantity dq, wherein the means for calculating a second auxiliary quantity is formed to calculate the second auxiliary quantity dq according to the following equation:

$$dq = d \bmod(q-1),$$

wherein q is a second prime number, wherein a product of p and q equals the modulus n;

means for generating a random number (IRND);

means for generating a third auxiliary quantity dp', wherein the means for generating a third auxiliary quantity dp' is formed to calculate the third auxiliary quantity according to the following equation:

$$dp' = IRND \times (p-1) + dp,$$

wherein IRND is a random number generated by the means for generating a random number, and wherein dp is the first auxiliary quantity calculated by the means for calculating a first auxiliary quantity;

means for generating a fourth auxiliary quantity dq', wherein dq' is defined according to the following equation:

$$dq' = IRND \times (q-1) + dq,$$

wherein IRND is the random number generated by the means for generating a random number, and wherein dq is the second auxiliary quantity calculated by the means for calculating a second auxiliary quantity;

means for generating a safety parameter T;

means for generating a fifth auxiliary quantity Mp, wherein the means for generating a fifth auxiliary quantity is formed to calculate the fifth auxiliary quantity Mp according to the following equation:

$$Mp = c^{dp'} \bmod(pT),$$

wherein T is a safety parameter generated by the means for generating a safety parameter, and wherein dp' is the third auxiliary quantity calculated by the means for calculating a third auxiliary quantity;

means for generating a sixth auxiliary quantity Mq, wherein the means for generating a sixth auxiliary quantity is formed to calculate the sixth auxiliary quantity Mq according to the following equation:

$$Mq = c^{dq'} \bmod(qT), \text{ and}$$

wherein T is the safety parameter generated by the means for generating a safety parameter, and wherein dq' is the fourth auxiliary quantity calculated by the means for calculating a fourth auxiliary quantity;

means for calculating a seventh auxiliary quantity H7, wherein the means for calculating the seventh auxiliary quantity is formed to calculate the seventh auxiliary quantity H7 according to the following equation:

$$H7 = Mp \times Mq \bmod T,$$

wherein T is the safety parameter T generated by the means for generating a safety parameter, wherein Mp is the fifth auxiliary quantity calculated by the means for generating a fifth auxiliary quantity, and wherein Mq is the sixth auxiliary quantity calculated by the means for generating a sixth auxiliary quantity;

means for calculating an eighth auxiliary quantity H8, wherein the means for calculating an eighth auxiliary quantity H8 is formed to calculate the eighth auxiliary quantity H8 according to the following equation:

$$H8 = c^{(dp' + dq' \bmod(T-1))} \bmod T,$$

wherein T is the safety parameter T generated by the means for generating a safety parameter, wherein dp' is the third auxiliary quantity calculated by the means for generating a third auxiliary quantity, and wherein dq' is the fourth auxiliary quantity calculated by the means for generating a fourth auxiliary quantity;

means for comparing the seventh auxiliary quantity H7 and the eighth auxiliary quantity H8, wherein the means for comparing is arranged to indicate an error if the seventh and eighth auxiliary quantities are different; and means for calculating the result of the modular exponentiation m in case no error has been indicated, wherein the means for calculating is formed to calculate the result m according to the following equation:

$m = Mq + [(Mp - Mq) \times q^{-1} \bmod p] \times q,$ wherein Mp is the fifth auxiliary quantity calculated by the means for generating a fifth auxiliary quantity, and wherein Mq is the sixth auxiliary quantity calculated by the means for generating a sixth auxiliary quantity.

2. The device according to claim 1, being provided for an RSA decryption or RSA signature, m being a plain text message, d being a private key and c being an encrypted message.

3. The device according to claim 1, wherein the safety parameter T is a prime number.

4. The device according to claim 1, wherein the safety parameter T is small compared to the first prime number p and the second prime number q, respectively.

5. A method for calculating a result of a modular exponentiation within an asymmetrical cryptosystem on a data processing device, n being a modulus, d being an exponent and a private key of the asymmetrical cryptosystem, c being a quantity to be subjected to the modular exponentiation, and, as a result, a quantity m is obtained which equals the modular exponentiation of c with the private key d as an exponent, comprising the following steps:

calculating a first auxiliary quantity dp, wherein dp is defined as follows:

$dp = d \bmod (p-1),$ wherein p is a first prime number;

calculating a second auxiliary quantity dq, wherein dq is defined as follows:

$dq = d \bmod (q-1),$ wherein q is a second prime number, wherein a product of p and q equals the modulus n;

providing a random number (IRND);

generating a third auxiliary quantity dp', wherein dp' is defined as follows:

$dp' = IRND \times (p-1) + dp;$ generating a fourth auxiliary quantity dq', wherein dq' is defined as follows:

$dq' = IRND \times (q-1) + dq;$ generating a safety parameter T;

generating a fifth auxiliary quantity Mp, wherein the fifth auxiliary quantity Mp is defined as follows:

$Mp = c^{dp'} \bmod (pT);$ generating a sixth auxiliary quantity Mq, wherein the sixth auxiliary quantity Mq is defined as follows:

$Mq = c^{dq'} \bmod (qT);$ calculating a seventh auxiliary quantity H7, wherein the seventh auxiliary quantity is defined as follows:

$H7 = Mp + Mq \bmod T;$ calculating an eighth auxiliary quantity H8, wherein the eighth auxiliary quantity H8 is defined as follows:

$H8 = c^{(dp' + dq' \bmod (T-1))} \bmod T;$ comparing the seventh auxiliary quantity H7 and the eighth auxiliary quantity H8;

indicating an error if the seventh and eighth auxiliary quantities are different; and in case no error has been indicated, calculating the result of the modular exponentiation m, wherein m is defined as follows:

$m = Mq + [(Mp - Mq) \times q^{-1} \bmod p] \times q.$

* * * * *